United States Patent [19]

Williams

[11] Patent Number: 5,695,168
[45] Date of Patent: Dec. 9, 1997

[54] AUTOMATIC VALVING UNIT, AND PRESSURE VESSEL HAVING AUTOMATIC VALVING

[76] Inventor: Richard T. Williams, P.O. Box 39, Uwchland, Chester County, Pa. 19480

[21] Appl. No.: 455,290

[22] Filed: May 31, 1995

[51] Int. Cl.$^6$ .................................................. F16L 37/28
[52] U.S. Cl. ..................... 251/149.4; 137/322; 210/234; 210/235
[58] Field of Search ........................ 210/235, 234; 137/321, 322; 251/149.4

[56] References Cited

U.S. PATENT DOCUMENTS

| | | | |
|---|---|---|---|
| 2,359,648 | 10/1944 | Jones | 251/149.4 |
| 3,228,413 | 1/1966 | Stevens, Jr. | 137/322 |
| 3,319,791 | 5/1967 | Horne | 210/324 |
| 4,077,876 | 3/1978 | Southall | 210/325 |
| 5,230,812 | 7/1993 | Williams | 210/767 |

FOREIGN PATENT DOCUMENTS 1205037  10/1958  France ............................. 210/235

*Primary Examiner*—A. Michael Chambers
*Attorney, Agent, or Firm*—John F. A. Earley; John F. A. Earley, III

[57] ABSTRACT

An automatic valving unit for a pressure vessel that holds a cartridge, loose media, and the like for conditioning and/or purifying a fluid, comprises a valve head having a first passageway extending through it and being adapted to be connected to a fluid transmission line, an outlet port formed at an outlet end portion of the first passageway in the valve head, a first valve member positioned in the first passageway of the valve head for blocking flow of fluid through the first passageway of the valve head when the pressure vessel is not connected to the valve head, a fluid inlet member formed on the pressure vessel for providing a passageway for fluid into the pressure vessel, said fluid inlet member including a first valve actuating member for opening the first valve member when the pressure vessel is connected to the valve head, and connecting/disconnecting members formed on the outlet port of the valve head and on the fluid inlet member of the pressure vessel for connecting the pressure vessel to the valve head, when desired, to permit flow of fluid from the first passageway of the valve head to the fluid inlet member of the pressure vessel, and for disconnecting the pressure vessel from the valve head, when desired, to stop flow of fluid from the first passageway of the valve head.

16 Claims, 9 Drawing Sheets

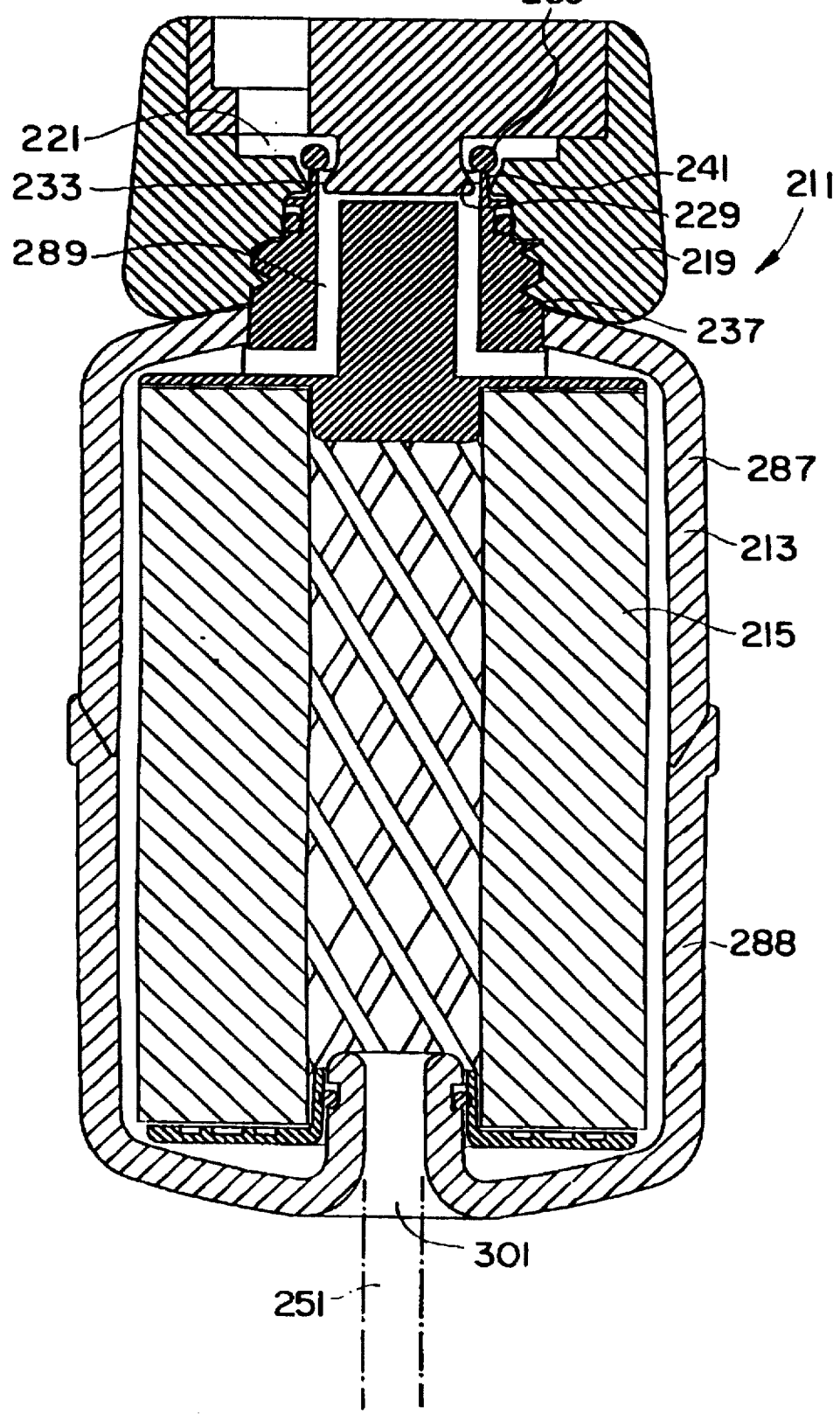

AUTOMATIC VALVING UNIT, AND PRESSURE VESSEL HAVING AUTOMATIC VALVING

BACKGROUND OF THE INVENTION

1. Field of the Invention

This invention relates to an automatic valving unit, and particularly concerns automatic valving for a fluid transmission line. More particularly, the invention concerns automatic valving for a pressure vessel for holding a cartridge, loose media, and the like for conditioning and/or purifying fluid. Even more particularly, the invention relates to automatic valving of such pressure vessels used in vending machines, such as vending machines that dispense cups of coffee, soda, and the like.

2. Description of the Prior Art

Pressure vessels for holding a cartridge filter and the like for conditioning and/or purifying fluid are used in residential drinking water systems, boats, recreational vehicles, and aircraft. Further, such pressure vessels are used in vending machines that dispense cups of coffee, soda, and the like for conditioning and/or purifying water prior to using the water in the liquid dispensed by the vending machine. A problem with known conditioning and/or purifying systems, which include pressure vessels, such as conditioning and/or purifying systems used in vending machines, is that they require a relatively large amount of space.

Further, closing a pressure vessel, which typically comprises a cover, a bowl, an O-ring seal, and a V-clamp or other closure means for holding the cover to the bowl and for compressing the O-ring seal, requires carefully aligning the cover and the bowl while at the same time manipulating the V-clamp or other closure means. This is a fairly cumbersome task, and a very difficult task when working on a pressure vessel that is positioned in a constrained area, such as those often encountered with vending machines.

Also, changing a cartridge filter and the like held in a pressure vessel often leads to a clean-up problem due to spillage from the lines from which the pressure vessel is disconnected.

SUMMARY OF THE INVENTION

It is an object of the invention to provide a compact valving unit for a pressure vessel.

It is another object of the invention to provide a valving unit for a pressure vessel that is automatic, that is, a valving unit, that automatically provides for fluid flow into the pressure vessel when the pressure vessel is in use and that automatically discontinues fluid flow when the pressure vessel is not in use.

Still, another object of the invention is to provide an automatic valving unit for a pressure vessel that permits the pressure vessel to be taken out of use with little or no spillage of fluid, i.e., a "dry change".

These and other objects are accomplished by providing an automatic valving unit for a pressure vessel that holds a cartridge, loose media, and the like for conditioning and/or purifying a fluid, that comprises a valve head having a first passageway extending through it and being adapted to be connected to a fluid transmission line, an outlet port formed at an outlet end portion of the first passageway in the valve head, first valve means positioned in the first passageway of the valve head for blocking flow of fluid through the first passageway of the valve head when the pressure vessel is not connected to the valve head, fluid inlet means formed on the pressure vessel for providing a passageway for fluid into the pressure vessel, said fluid inlet means formed on the pressure vessel including first valve actuating means for opening the first valve means when the pressure vessel is connected to the valve head, and connecting/disconnecting means formed on the outlet port of the valve head and on the fluid inlet means of the pressure vessel for connecting the pressure vessel to the valve head, when desired, to permit flow of fluid from the first passageway of the valve head to the fluid inlet means of the pressure vessel, and for disconnecting the pressure vessel from the valve head, when desired, to stop flow of fluid from the first passageway of the valve head.

The automatic valving unit also includes a second passageway extending through the valve head adapted to be connected to a fluid receiving line at an outlet port of the second passageway, an inlet port formed at an inlet end portion of the second passageway of the valve head, second valve means positioned in the second passageway of the valve head for blocking flow of fluid from the inlet port of the second passageway of the valve head when the pressure vessel is not connected to the valve head, and fluid outlet means formed on the pressure vessel for providing a passageway for fluid from the pressure vessel, said fluid outlet means formed on the pressure vessel including second valve actuating means for opening the second valve means when the pressure vessel is connected to the valve head.

To obtain a compact structure, the fluid outlet means formed on the pressure vessel is positioned inside and surrounded by the fluid inlet means formed on the pressure vessel, and the second passageway of the valve head is positioned inside and surrounded by an annular passageway portion of the first passageway of the valve head.

BRIEF DESCRIPTION OF THE DRAWINGS

FIG. 10 is a view in cross-section of an alternative embodiment of the invention, and shows an automatic valving unit for a pressure vessel having in-line flow;

DETAILED DESCRIPTION OF THE DRAWINGS

Figure 1:
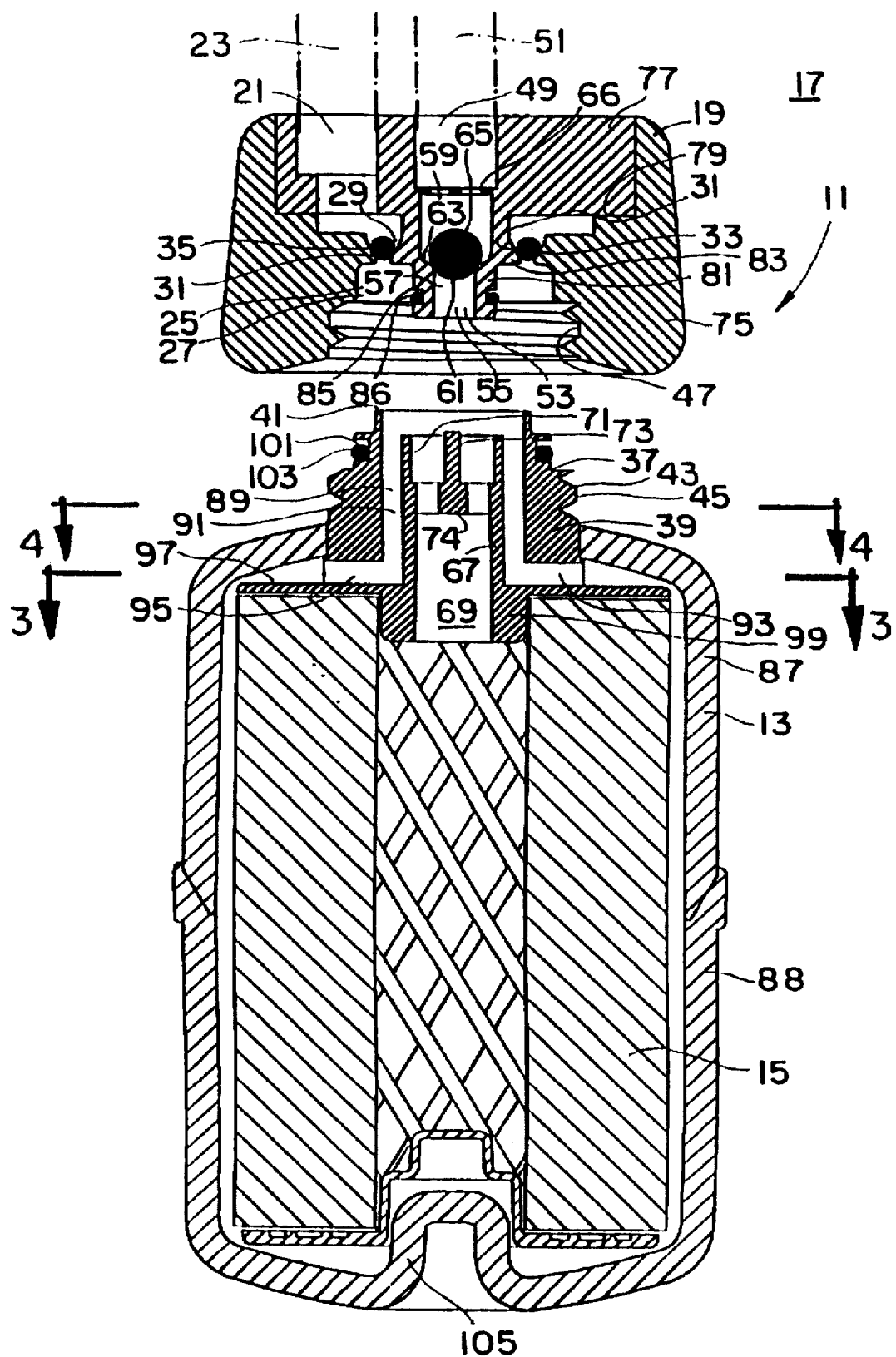
FIG. 1 is a view in cross section of a pressure vessel having an automatic valving unit constructed in accordance with the invention, in which the valves are closed in the valve head.
Figure 2:
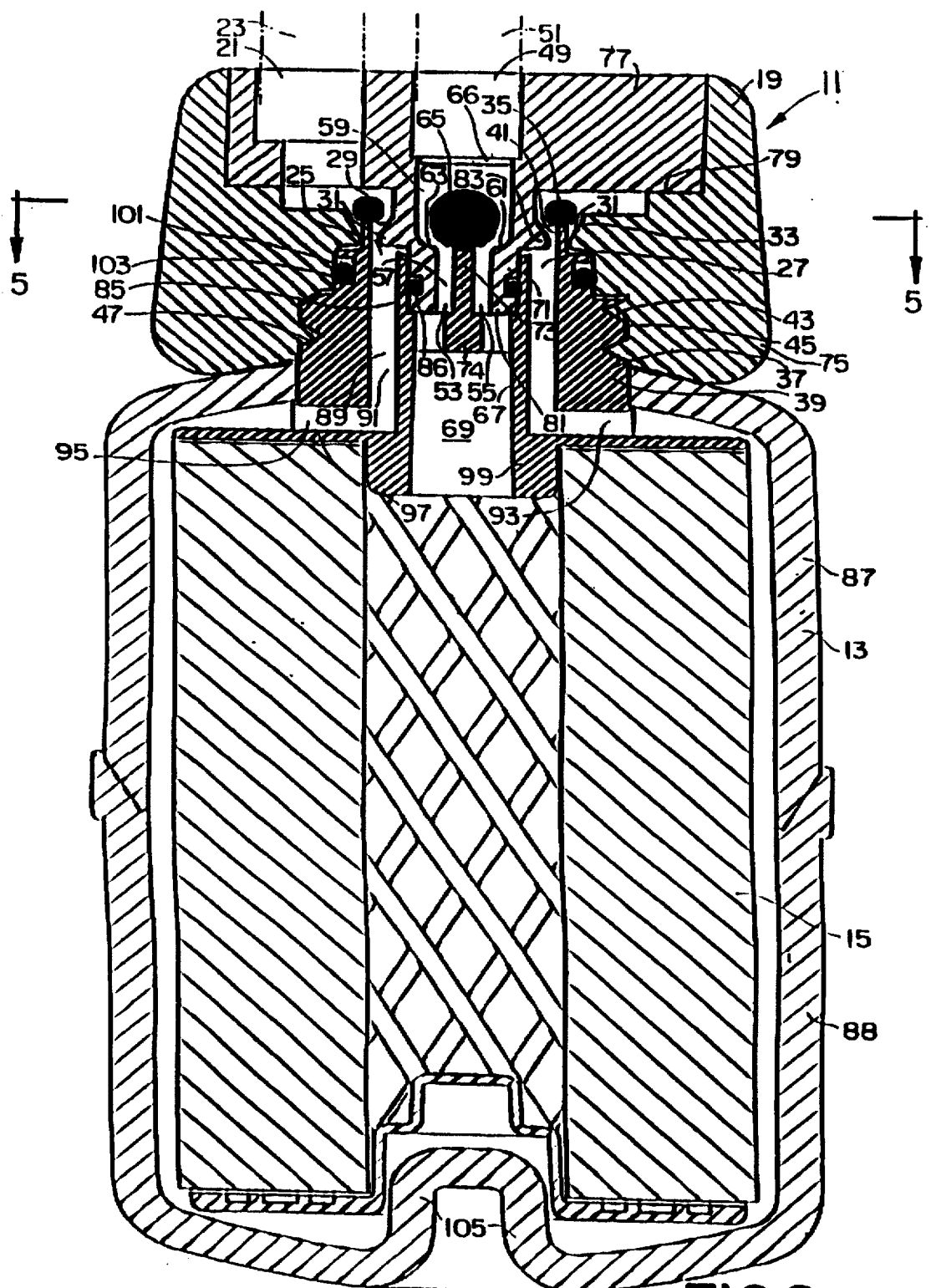
FIG. 2 is a view in cross-section of the pressure vessel of FIG. 1 connected to the valve head of FIG. 1, the valves in the valve head being opened due to the connection of the pressure vessel to the valve head.

Turning to the drawings, there is shown in FIGS. 1-2 an automatic valving unit 11 for a pressure vessel 13 that holds a cartridge 15, loose media, and the like for conditioning and/or purifying a fluid, such as water, used in a vending machine 17 that dispenses cups of coffee, soda, and the like, for example.

Automatic valving unit 11 comprises a valve head 19 having a first passageway 21 that extends through valve head 19 and is adapted to be connected to a fluid transmission line 23, such as a water line in a vending machine 17.

An outlet port 25 is formed at an outlet end portion 27 of the first passageway 21 in valve head 19.

First valve means is positioned in the first passageway 21 of valve head 19 for blocking flow of fluid through the first passageway 21 of valve head 19 when the pressure vessel 13 is not connected to the valve head 19. The first valve means includes an annular passageway portion 29 of the first passageway 21, the annular passageway portion 29 being defined by opposing first passageway walls 31 which are tapered towards each other forming a first valve seat 33. An annular seal 35 is positioned in the annular passageway portion 29 and is sized to block flow of fluid through the first passageway 21 of valve head 19 when the annular seal 35 rests on the first valve seat 33 and to permit flow of fluid through the first passageway 21 of valve head 19 when the annular seal 35 is displaced from the first valve seat 33.

Fluid inlet means is formed on the pressure vessel 13 for providing a passageway for fluid into the pressure vessel 13. The fluid inlet means comprises a first tube 37 which is part of a manifold 39 of pressure vessel 13.

The fluid inlet means of the pressure vessel 13 includes first valve actuating means for opening the first valve means of the valve head 19 when the pressure vessel 13 is connected to the valve head 19. The first valve actuating means comprises an end portion 41 of the first tube 37 that is sized to be received in the annular passageway portion 29 of the first passageway 21 of valve head 19 to push the annular seal 35 away from the first valve seat 33 without closing the outlet port 25 of valve head 19 to allow flow of fluid from the outlet port 25 of the valve head 19 into the first tube 37 of the manifold 39 of pressure vessel 13 when the pressure vessel 13 is connected to the valve head 19.

Connecting/disconnecting means is formed in the outlet port 25 of the valve head 19 and on the fluid inlet means of the pressure vessel 13 for connecting the pressure vessel 13 to the valve head 19, when desired, to permit flow of fluid from the first passageway 21 of the valve head 19 into the tube 37 of the manifold 39 of pressure vessel 13, and for disconnecting the pressure vessel 13 from the valve head 19, when desired, to stop flow of fluid from the first passageway 21 of the valve head 19. The connecting/disconnecting means includes threads 43 formed on an outer surface 45 of the tube 37 of manifold 39 and matching threads 47 that are formed on the valve head 19. Threads 43 and 47 may comprise any of a number of types of threading, including, for example, single-lead threading, double-lead threading, triple-lead threading, and interrupted threading.

A second passageway 49 is formed in and extends through the valve head 19. Second passageway 49 is adapted to be connected to a fluid receiving line 51, such as a water line for handling treated water in a vending machine 17. An inlet port 53 is formed at an inlet end portion 55 of the second passageway 49 of the valve head 19.

Figure 7:
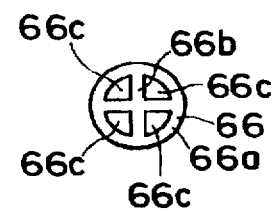
FIG. 7 is a view in top plan of a retainer disk.

Second valve means is positioned in the second passageway 49 of valve head 19 for blocking flow of fluid, that is, backflow from the fluid receiving line 51 through passageway 49 and into the inlet port 53 of valve head 19 when the pressure valve 13 is not connected to the valve head 19. The second valve means includes a first section 57 of second passageway 49 and a second section 59 of second passageway 49 that is adjacent to the first section 57 of passageway 49. Both first section 57 and second section 59 have circular cross-sections, and the cross-section of first section 57 is smaller than the cross-section of second section 59. A second valve seat 61 is formed at the passageway wall 63 between the first section 57 and the second section 59 of the second passageway 49. A spherical seal 65, preferably made of deformable elastermic material, is positioned in the second section 59 of second passageway 49 of valve head 19 and is sized to block flow of fluid, that is, backflow, into the inlet port 53 of valve head 19 when the spherical seal 65 rests on the second valve seat 61 and to permit flow of fluid through the second passageway 49 of the valve head 19 when the spherical seal 65 is displaced from the second valve seat 61. Referring to FIGS. 1-2, and more particularly to FIG. 7, spherical seal 65 is captured in the second section 59 of the second passageway 49 by a retainer disk 66 having a circular rim 66a that defines an opening and a cross 66b that is connected to the rim and extends across the opening and divides the opening into four sub-openings 66c. Retainer disk 66 is press fit into position in the upper end portion of the second section 59 of the second passageway 49, and blocks spherical seal 65 from flowing past it while permitting flow of fluid through the four sub-openings 66c.

Fluid outlet means is formed on the pressure vessel 13 for providing a passageway for fluid from the pressure vessel 13. The fluid outlet means comprises a second tube 67 which is part of manifold 39 of the pressure vessel 13. Second tube 67 has a passageway 69 extending through it, and second tube 67 has an end portion 71 that is sized to engage the inlet port 53 of the valve head 19.

Figure 4:
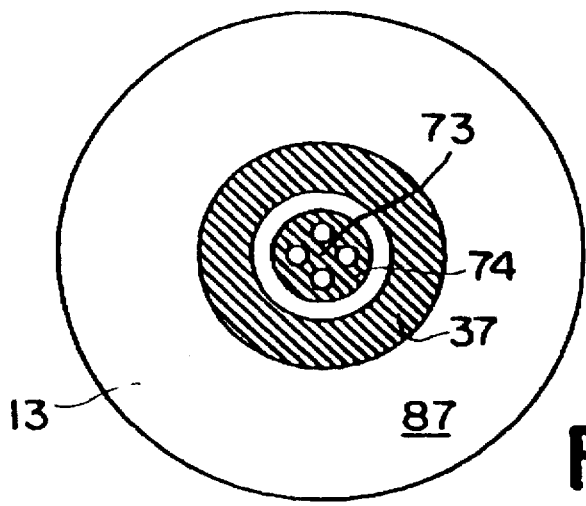
FIG. 4 is a view in section taken along the lines and arrows 4—4 of FIG. 1.
Figure 5:
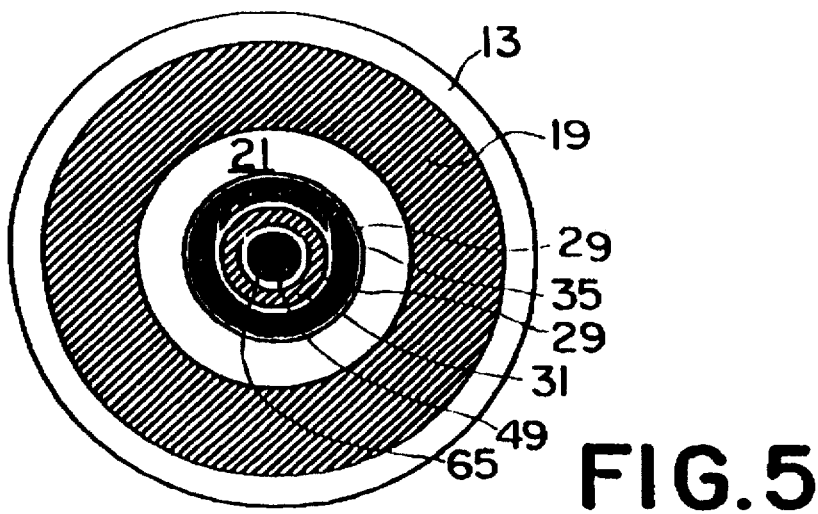
FIG. 5 is a view in section taken along the lines and arrows 5—5 shown in FIG. 2.
Figure 6:
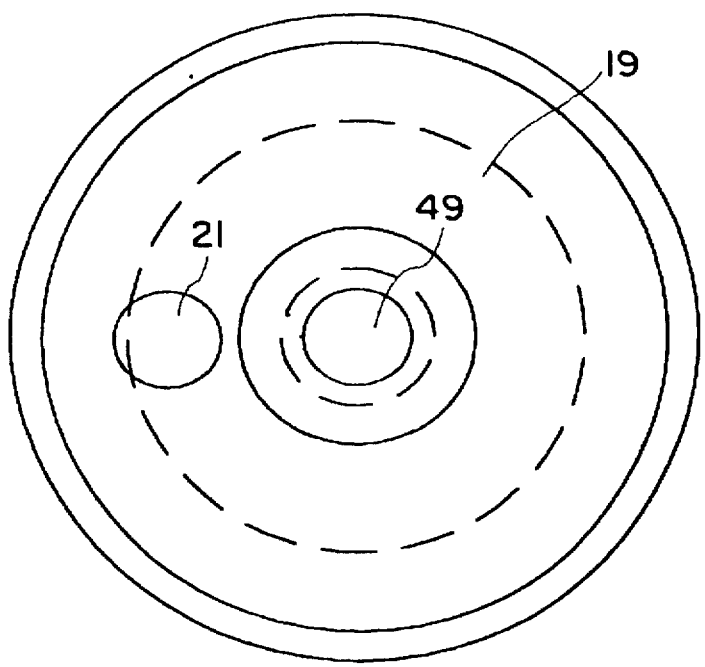
FIG. 6 is a view in top plan of the valve head shown in FIGS. 1 and 2.

The fluid outlet means of the pressure vessel 13 includes second valve actuating means for opening the second valve means of the valve head 19 when the pressure vessel 13 is connected to the valve head 19. As shown in FIGS. 1-2, and 4, the second valve actuating means comprises a valve actuating pin 73 that is formed on a perforated platform 74 positioned in and extending across the inside of the second tube 67 of manifold 39 of the pressure vessel 13. Valve actuating pin 73 is sized to push spherical seal 65 away from the second valve seat 61 of valve head 19 to permit flow of fluid from the second tube 67 of manifold 39 of pressure vessel 13 to and through the second passageway 49 of valve head 19 when the pressure vessel 13 is connected to the valve head 19.

As shown in FIGS. 1-2, the tube 67 of manifold 39 of the pressure vessel 13 is positioned inside and surrounded by the first tube 37 of manifold 39 of the pressure vessel 13, and the second passageway 49 of valve head 19 is positioned inside and surrounded by the annular passageway portion 29 of the first passageway 21 in the valve head 19.

Valve head 19 comprises a ring-like first component 75, and a second component 77 that is sized to fit inside component 75 and to rest on an internal ledge 79 of first component 75. First component 75 and second component 77 are welded together after the annular seal 35 is placed around a tube portion 81 beyond an annular protuberance 83 that acts as the inner tapered portion of the first passageway walls 31 that forms the inner half of first valve seat 33. Tube portion 81 has a groove 85 formed in and extending around its outer surface, and an annular gasket 86, such as an O-ring, is seated in the groove 85 to provide a seal between the tube portion 81 and the inner surface of the second tube 67 of manifold 39 of the pressure vessel 13 when the pressure vessel 13 is connected to the valve head 19.

Preferably, pressure vessel 13 comprises a plastic cover 87, manifold 39 mounted thereon, preferably by welding, and extending through the cover 87, and a plastic bowl 88 positioned below and connected to the cover 87.

The manifold 39 includes second tube 67 which has passageway 69 extending longitudinally through the center of manifold 39. A second passageway 89 is formed in manifold 39 and has an annular passageway portion 91 that is formed between tube 67 and tube 37. When the pressure vessel 13 is connected to the valve head 19, fluid may flow from the annular passageway portion 29 of the first passageway 21 into the annular passageway portion 91 of passageway 89 of the valve head 19.

Figure 3:
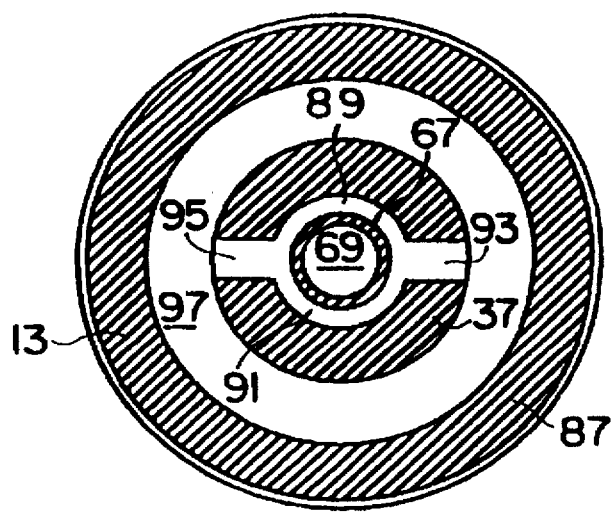
FIG. 3 is a view in section taken along the lines and arrows 3—3 shown in FIG. 1.

As shown in FIGS. 1–3, passageway 89 has two portions 93 and 95 located at the lower end portion of the annular passageway portion 91 that extend outwardly from the annular passageway portion 91 through second tube 37 which permits passage of fluid from the annular passageway portion 91 of passageway 89 into the pressure vessel 13 and into contact with cartridge 15.

Connection means for connecting a cartridge 15 to the manifold 39 is formed on the lower end portion of manifold 39 below the passageway 89, and includes a platform 97 that surrounds the second tube 67 and a hollow stub 99 that extends downwardly below the platform 97 from second tube 67.

A groove 101 is formed in and extends around the outer surface 45 of the first tube 37 above the threads 43, and an annular gasket 103, such as an O-ring, is seated in the groove 101 to provide a seal between the first tube 37 and the valve head 19 when pressure vessel 13 is connected to the valve head 19.

Bowl 88 is provided with a stabilizing stub 105 which receives the lower end portion of a cartridge 15 to prevent the cartridge 15 from swaying back and forth inside the pressure vessel 13 during use.

After cartridge 15 is secured onto stub 99 of manifold 39 and onto stabilizing stub 105 of the bowl 88, the cover 87 is welded to the bowl 88 to produce a pressure vessel cartridge that may be used and then thrown away after use.

Figure 9:
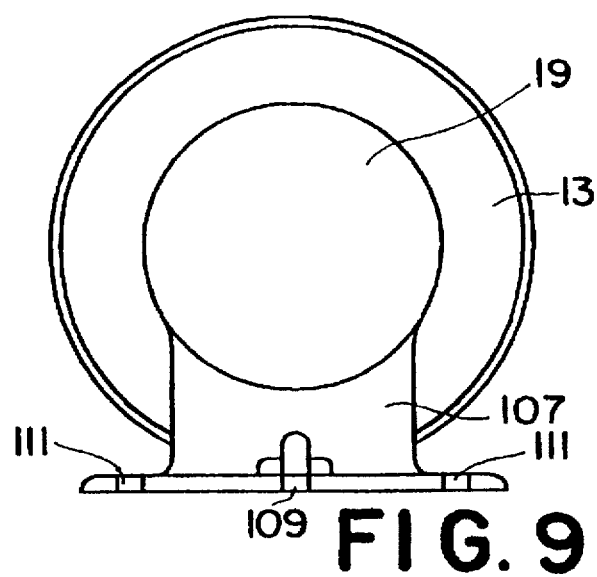
FIG. 9 is a view in top plan of the valve head and the pressure vessel shown in FIG. 8.
Figure 8:
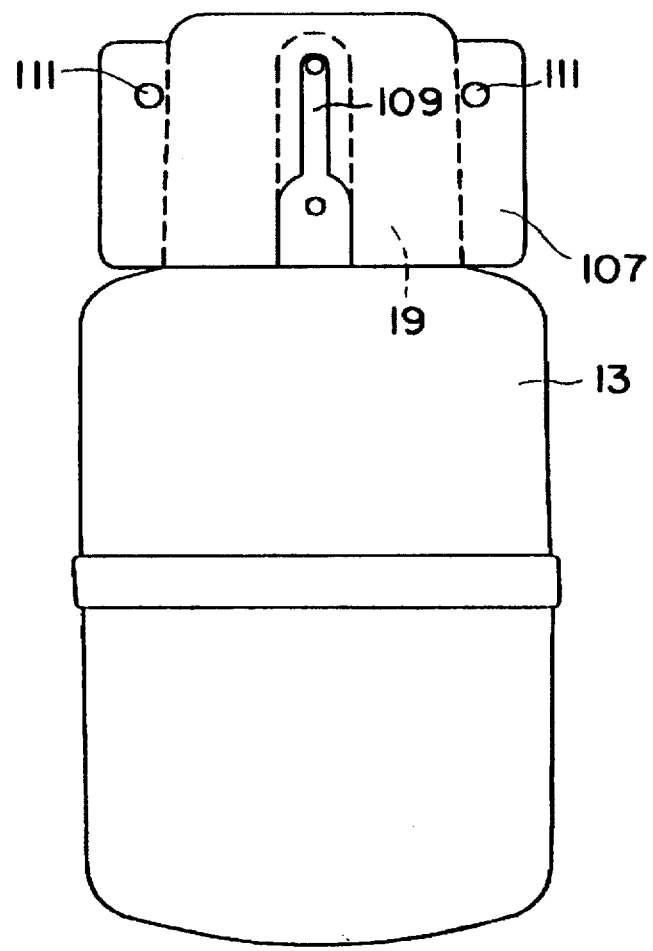
FIG. 8 is a view in rear elevation of a pressure vessel connected to a valve head having a mounting bracket formed thereon.
Figure 11:
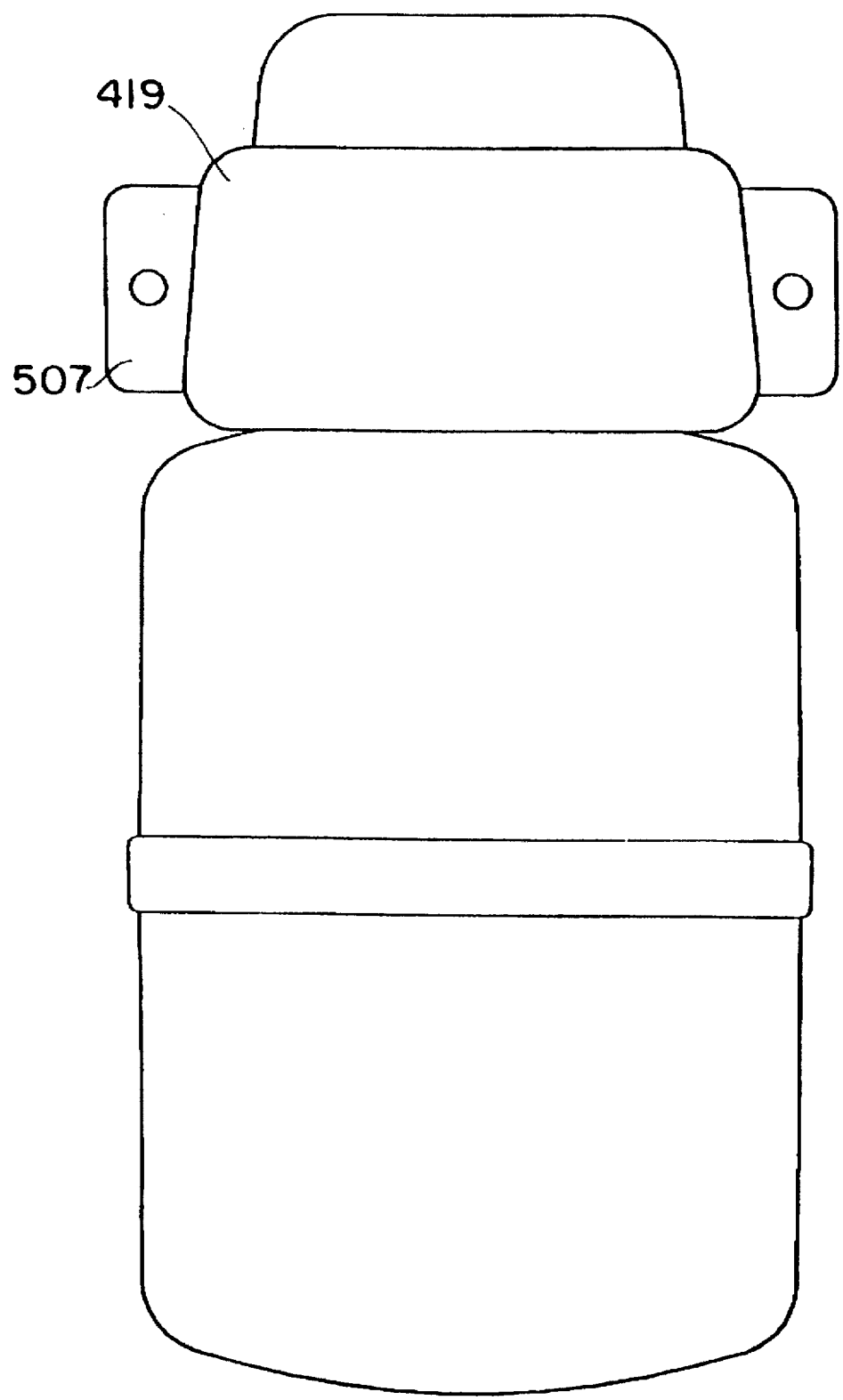
FIG. 11 is a view in front elevation of another alternative embodiment of the invention.
Figure 12:
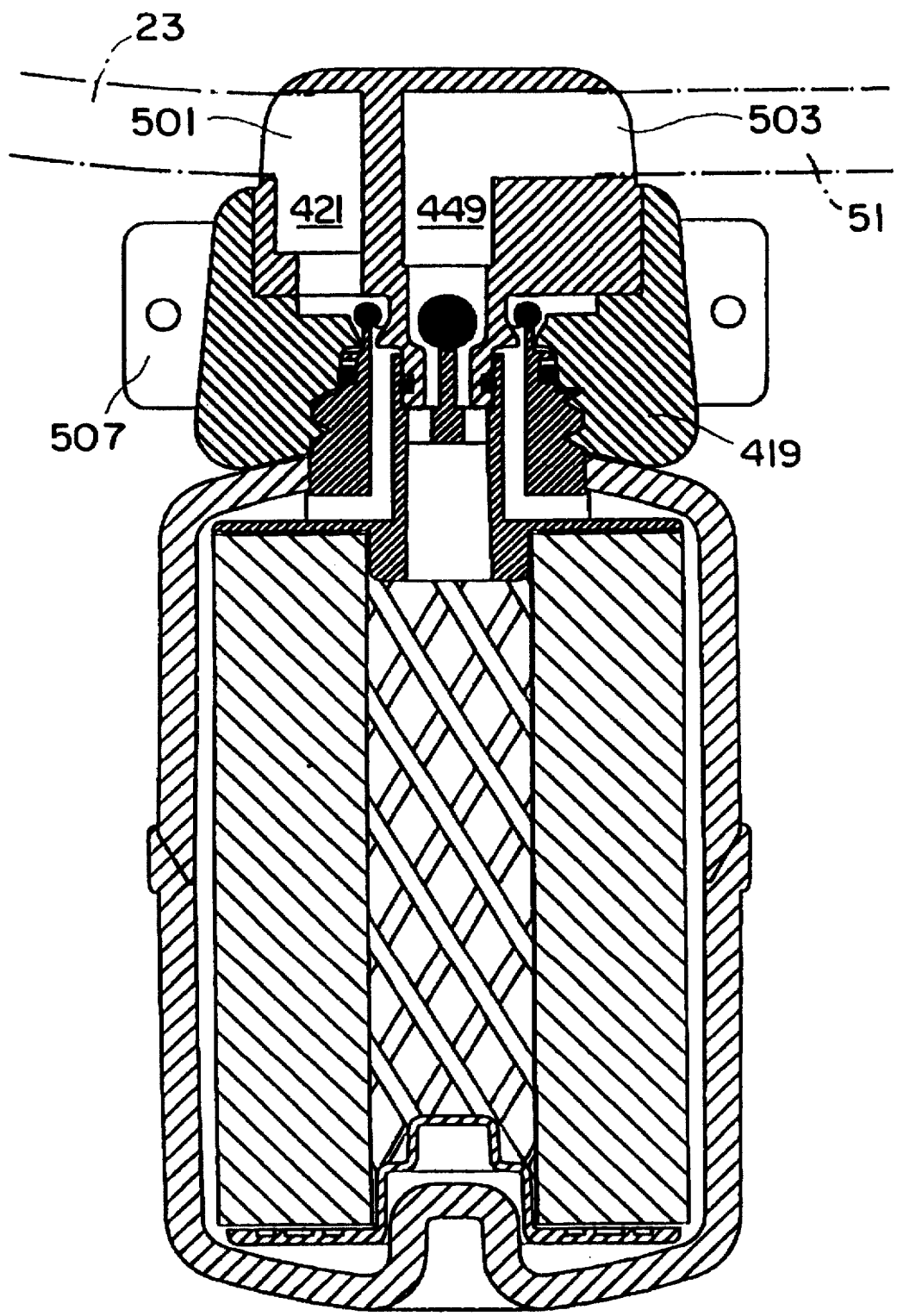
FIG. 12 is a view in cross-section of the alternative embodiment of the invention shown in FIG. 11.
Figure 13:
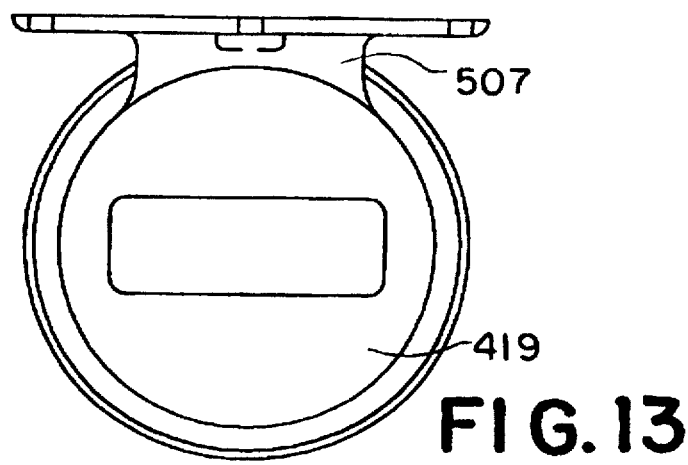
FIG. 13 is a top plan view of the alternative embodiment of the invention shown in FIG. 11.
Figure 14:
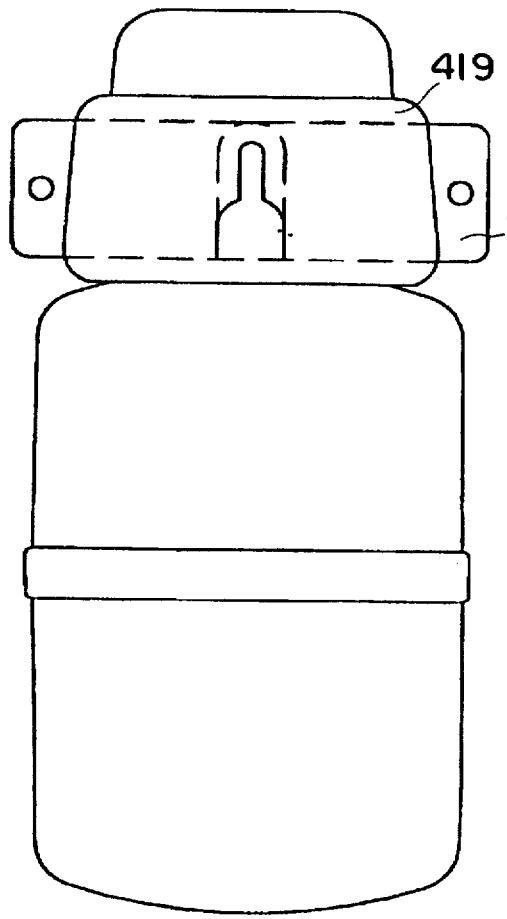
FIG. 14 is a view in rear elevation of the alternative embodiment of the invention shown in FIG. 11.
Figure 15:
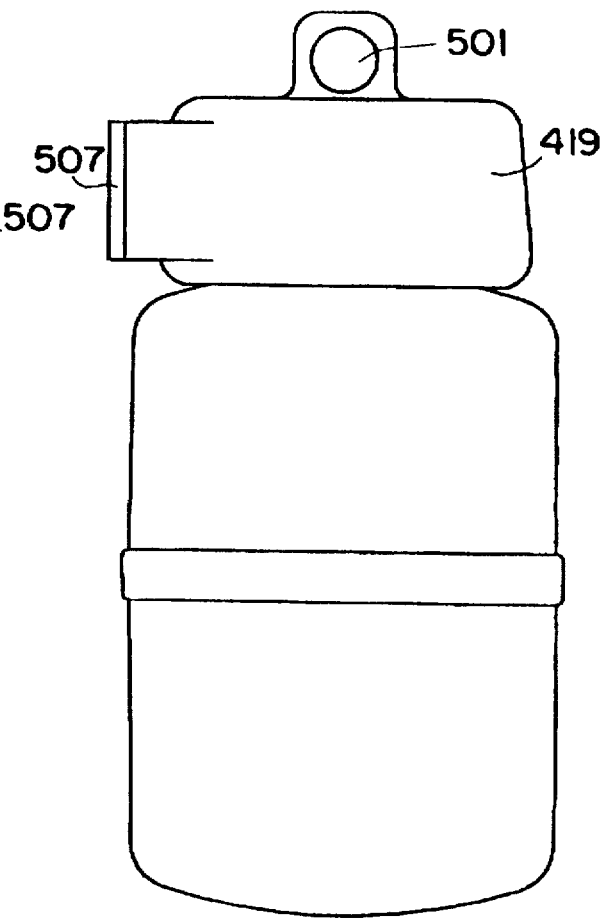
FIG. 15 is a view in side elevation of the alternative embodiment of the invention shown in FIG. 11.

Turning to FIGS. 8 and 9, valve head 19 optionally may be provided with a bracket 107 formed thereon, with bracket 107 being provided with mounting means, such as a slot 109, for receiving a screw head of a screw secured to a vending machine 17 and/or holes 111 for receiving screws to be secured to a vending machine 17, for mounting the valve head 19 to a vending machine 17, for example.

In operation, valve head 19 is connected to a fluid transmission line 23, such as a water line in a vending machine 17. Prior to connection with the pressure vessel 13, the fluid from transmission line 23 pushes annular seal 35 against the first valve seat 33, thereby blocking flow of fluid through the first passageway 21 of valve head 19.

As shown in FIG. 2, when pressure vessel 13 is connected to the valve head 19 by screwing threads 43 of manifold 39 into threads 47 on valve head 19, the end portion 41 of the first tube 37 of manifold 39 of the pressure vessel 13 is received in the annular passageway portion 29 of the first passageway 21 of valve head 19 and pushes the annular seal 35 upwardly away from the first valve seat 33 without closing the outlet port 25 of the valve head 19 to allow flow of fluid from the outlet port 25 of the valve head 19 into annular passageway portion 91 of passageway 89 inside first tube 37 of the manifold 39. The very slight vertical motion of the annular seal 35 opens a significantly larger passageway for fluid flow than afforded by presently available valving means.

With the annular seal 35 pushed away from the first valve seat 33, fluid may flow from first passageway 21 of valve head 19 into and through passageway 89 and into pressure vessel 13. The fluid is then conditioned and/or purified by moving through the cartridge 15, and the conditioned and/or purified fluid moves through the passageway 69 in second tube 67 into and through the second passageway 49 in valve head 19 to the fluid receiving line 51 for handling the treated fluid. When the pressure vessel 13 is connected to the valve head 19, the valve actuating pin 73 pushes spherical seal 65 upwardly away from the second valve seat 61 of the valve head 19 to permit flow of fluid through the second passageway 49 of valve head 19.

When it is desired to replace pressure vessel 13 when cartridge 15 is used up, pressure vessel 13 is easily screwed from valve head 19.

As pressure vessel 13 is screwed from valve head 19, the end portion 41 of first tube 37 of manifold 39 of pressure vessel 13 moves away from annular seal 35 permitting fluid moving into first passageway 21 from the fluid transmission line 23 to push the annular seal 35 against the first valve seat 33 to seal closed the outlet port 25 of the valve head 19.

Also, as pressure vessel 13 is screwed from valve head 19, the valve actuating pin 73 moves away from the spherical seal 65. Fluid backflowing from the second passageway 49 now pushes spherical seal 65 downwardly against the second valve seat 61 of the valve head 19 to seal closed the inlet port 53 of the valve head 19 to block fluid spilling back out from the second passageway 49 of the valve head 19.

FIG. 1 shows the pressure vessel 13 disconnected from the valve head 19, resulting in the first valve means and the second valve means of the valve head 19 being closed.

A replacement pressure vessel 13 may then be easily secured onto the valve head 19 by screwing the replacement pressure vessel 13 into the valve head 19.

Turning now to FIG. 10, there is shown an alternative embodiment of the invention in which an automatic valving unit 211 is provided for a pressure vessel 213 and in-line flow of fluid is provided in the pressure vessel 213. Automatic valving unit 211 includes a valve head 219 that is similar to valve head 19, except that valve head 219 is not provided with a second passageway like second passageway 49 of valve head 19.

Further, in this embodiment of the invention, a tube 237, which is welded into the top wall of cover 287, is similar to first tube 37 of manifold 39. However, in this embodiment of the invention, there is no outlet tube positioned inside tube 237 like second tube 67 of manifold 39.

Automatic valving unit 211 operates in substantially the same manner as automatic valving unit 11 with respect to fluid flowing from valve head 219 into pressure vessel 213. When pressure vessel 213 is screwed into valve head 219, an upper end portion 241 of tube 237 pushes an annular seal 235 away from a valve seat 233 to permit flow of fluid from an annular passageway portion 229 of passageway 221 of valve head 219 into a passageway 289 of tube 237, and from passageway 289, which has the same configuration as passageway 89 in manifold 39, into pressure vessel 213. When pressure vessel 213 is unscrewed from valve head 219, fluid moving through passageway 221 of valve head 219 pushes the annular seal 235 down against valve seat 233 to block flow through passageway 221.

In this embodiment, pressure vessel 213 is provided with an outlet port 301 formed in the bottom wall of bowl 288, and fluid that passes into pressure vessel 213 passes through a cartridge 215 and out outlet port 301 into a fluid receiving line 251.

Turning next to FIGS. 11–15, there is shown another embodiment of the invention in which a valve head 419 is provided in place of valve head 19. In this embodiment of the invention, valve head 419 has substantially the same construction as valve head 19, except, unlike passageway 21 of valve head 19, passageway 421 is provided with a configuration which leads to an inlet port 501 formed in a side portion of the valve head 419 that is adapted to connect to fluid transmission line 23.

Similarly, in this embodiment of the invention, valve head 419 is provided with a passageway 449 which, unlike passageway 49 of valve head 19, is provided with a configuration which leads to an outlet port 503 formed in a side portion of the valve head 419 that is adapted to connect to a fluid receiving line 51.

Like valve head 19, valve head 419 may have a bracket 507 formed thereon. Bracket 507 has mounting means for mounting the valve head 419 to a vending machine 17, for example, such as those of bracket 107.

The valve heads 19, 219, and 419, the manifold 39, the tube 237, the tube 267, and the covers and bowls of pressure vessels 13 and 213 are preferably made of plastic, but may be made of metal or a combination of plastic and metal. When the pressure vessel is made of metal, the cover is preferably joined to the bowl with a V-clamp or the securing device disclosed in my U.S. Pat. No. 5,230,812 issued on Jul. 27, 1993, which is incorporated herein by reference.

The gaskets used in the various embodiments of the invention are preferably made of any of several elastomeric materials.

Alternatively, seal 65 may have a truncated cone shape, a mushroom shape, a disk shape or other appropriate shape which would block passageway 49 when desired.

The valve head 19 and pressure vessel 13 may be oriented in any orientation, whether it be horizontal, vertical, or any other orientation.

ADVANTAGES

Advantages of this invention include an easy and effective way to automatically shut off fluid flow into a pressure vessel when replacing one pressure vessel with another. The pressure vessel may be installed quickly and easily with just one hand, and the pressure vessel may be disconnected quickly and easily from the valve head with just one hand. The invention also provides for rapid shut off of fluid flow when the pressure vessel is disconnected from the valve head, as well as providing for full flow of fluid quickly when the pressure vessel is connected to the valve head.

The invention provides a compact configuration. Further, the invention allows for the pressure vessel to be disconnected from the valve head with little or no spillage of fluid.

The invention may be adapted for use in residential drinking water systems, vending machines, coffee machines, and other applications requiring compact, convenient, highly efficient fluid treatment and control.

I claim:

1. An automatic valving unit for a pressure vessel that holds a cartridge, loose media, and the like for conditioning and/or purifying a fluid, comprising a valve head having a first passageway extending through it and being adapted to be connected to a fluid transmission line, an outlet port formed at an outlet end portion of the first passageway in the valve head, first valve means positioned in the first passageway of the valve head for blocking flow of fluid through the first passageway of the valve head when the pressure vessel is not connected to the valve head, fluid inlet means formed on the pressure vessel for providing a passageway for fluid into the pressure vessel, said fluid inlet means including first valve actuating means for opening the first valve means when the pressure vessel is connected to the valve head, connecting/disconnecting means formed on the outlet port of the valve head and on the fluid inlet means of the pressure vessel for connecting the pressure vessel to the valve head, when desired, to permit flow of fluid from the first passageway of the valve head to the fluid inlet means of the pressure vessel, and for disconnecting the pressure vessel from the valve head, when desired, to stop flow of fluid from the first passageway of the valve head, an annular passageway portion of the first passageway defined by opposing first passageway walls, said opposing passageway walls being tapered towards each other along the annular passageway portion forming a first valve seat, and an annular seal positioned in the annular passageway portion of the first passageway, the annular seal being sized to block flow of a fluid through the first passageway when the annular seal rests on the first valve seat and to permit flow of fluid through the first passageway when the annular seal is displaced from the first valve seat.

2. The automatic valving unit of claim 1, the fluid inlet means on the pressure vessel including a first tube.

3. The automatic valving unit of claim 2, the first valve actuating means including an end portion of the first tube sized to be received in the annular passageway portion of the first passageway of the valve head to push the annular seal away from the first valve seat without closing the outlet port of the valve head to allow flow of fluid from the outlet port of the valve head into the first tube of the pressure vessel when the pressure vessel is connected to the valve head.

4. The automatic valving unit of claim 2, the connecting/disconnecting means including threads formed on an outer surface of the first tube of the pressure vessel and matching threads formed on the valve head.

5. An automatic valving unit for a pressure vessel that holds a cartridge, loose media, and the like for conditioning and/or purifying a fluid, comprising a valve head having a first passageway extending through it and being adapted to be connected to a fluid transmission line, an outlet port formed at an outlet end portion of the first passageway in the valve head, first valve means positioned in the first passageway of the valve head for blocking flow of fluid through the first passageway of the valve head when the pressure vessel is not connected to the valve head, fluid inlet means formed on the pressure vessel for providing a passageway for fluid into the pressure vessel, said fluid inlet means including first valve actuating means for opening the first valve means when the pressure vessel is connected to the valve head, and connecting/disconnecting means formed on the outlet port of the valve head and on the fluid inlet means of the pressure vessel for connecting the pressure vessel to the valve head, when desired, to permit flow of fluid from the first passageway of the valve head to the fluid inlet means of the pressure vessel, and for disconnecting the pressure vessel from the valve head, when desired, to stop flow of fluid from the first passageway of the valve head, further including a second passageway extending through the valve head adapted to be connected to a fluid receiving line at an outlet port of the second passageway, an inlet port formed at an inlet end portion of the second passageway of the valve head, second valve means positioned in the second passageway of the valve head for blocking flow of fluid from the inlet port of the second passageway of the valve head when the pressure vessel is not connected to the valve head, and fluid outlet means formed on the pressure vessel for providing a passageway for fluid from the pressure vessel, said fluid outlet means including second valve actuating means for opening the second valve means when the pressure vessel is connected to the valve head.

6. The automatic valving unit of claim 5, the second valve means including a first section of the second passageway of the valve head having a circular cross-section, a second section of the second passageway which is adjacent to the first section of the second passageway, the cross-section of the first section being smaller than the cross-section of the second section, a second valve seat formed between the first and second sections of the second passageway, and a spherical seal positioned in the second passageway of the valve head, the spherical seal being sized to block flow of fluid from the inlet port of the second passageway of the valve head when the spherical seal rests on the second valve seat and to permit flow of fluid through the second passageway of the valve head when the spherical seal is displaced from the second valve seat.

7. The automatic valving unit of claim 5, the fluid outlet means formed on the pressure vessel including a second tube having a passageway extending therethrough, the second tube having an end portion sized to engage the inlet port of the valve head.

8. The automatic valving unit of claim 7, the second valve actuating means including a perforated platform positioned in and extending across the inside of the second tube of the outlet port of the pressure vessel, and a valve actuating pin positioned on the platform for pushing the spherical seal away from the second valve seat in the inlet port of the valve head to permit flow of fluid from the second tube of the pressure vessel to and through the second passageway of the valve head when the pressure vessel is connected to the valve head.

9. The automatic valving unit of claim 8, the second tube of the outlet port of the pressure vessel being positioned inside the first tube of the fluid inlet means of the pressure vessel, and the second passageway in the valve head being positioned inside the annular passageway portion of the first passageway of the valve head.

10. The automatic valving unit of claim 5, the fluid outlet means formed on the pressure vessel being positioned inside and surrounded by the fluid inlet means formed on the pressure vessel, and the second passageway of the valve head being positioned inside and surrounded by an annular passageway portion of the first passageway of the valve head.

11. An automatic valving unit for a pressure vessel that holds a cartridge, loose media, and the like for conditioning and/or purifying a fluid, comprising a valve head having a first passageway extending through it and being adapted to be connected to a fluid transmission line, an outlet port formed at an outlet end portion of the first passageway in the valve head, first valve means positioned in the first passageway of the valve head for blocking flow of fluid through the first passageway of the valve head when the pressure vessel is not connected to the valve head, fluid inlet means formed on the pressure vessel for providing a passageway for fluid into the pressure vessel, said fluid inlet means including first valve actuating means for opening the first valve means when the pressure vessel is connected to the valve head, and connecting/disconnecting means formed on the outlet port of the valve head and on the fluid inlet means of the pressure vessel for connecting the pressure vessel to the valve head, when desired, to permit flow of fluid from the first passageway of the valve head to the fluid inlet means of the pressure vessel, and for disconnecting the pressure vessel from the valve head, when desired, to stop flow of fluid from the first passageway of the valve head, the first valve means including, an annular passageway portion of the first passageway defined by opposing first passageway walls, said opposing passageway walls being tapered towards each other along the annular passageway portion forming a first valve seat, and an annular seal positioned in the annular passageway portion of the first passageway, the annular seal being sized to block flow of a fluid through the first passageway when the annular seal rests on the first valve seat and to permit flow of fluid through the first passageway when the annular seal is displaced from the first valve seat, the fluid inlet means including a first tube, the first valve actuating means including an end portion of the first tube sized to be received in the annular passageway portion of the first passageway of the valve head to push the annular seal away from the first valve seat without closing the outlet port of the valve head to allow flow of fluid from the outlet port of the valve head into the first tube of the pressure vessel when the pressure vessel is connected to the valve head, the connecting/disconnecting means including threads formed on an outer surface of the first tube and matching threads formed on the valve head, further including a second passageway extending through the valve head adapted to be connected to a fluid receiving line at an outlet port of the second passageway, an inlet port formed at an inlet end portion of the second passageway of the valve head, second valve means positioned in the second passageway of the valve head for blocking flow of fluid from the inlet port of the second passageway of the valve head when the pressure vessel is not connected to the valve head, and fluid outlet means formed on the pressure vessel for providing a passageway for fluid from the pressure vessel, said fluid outlet means including second valve actuating means for opening the second valve means when the pressure vessel is connected to the valve head, the second valve means including a first section of the second passageway of the valve head having a circular cross-section, a second section of the second passageway which is adjacent to the first section of the second passageway, the cross-section of the first section being smaller than the cross-section of the second section, a second valve seat formed between the first and second sections of the second passageway, and a spherical seal positioned in the second passageway of the valve head, the spherical seal being sized to block flow of fluid from the inlet port of the second passageway of the valve head when the spherical seal rests on the second valve seat and to permit flow of fluid through the second passageway of the valve head when the spherical seal is displaced from the second valve seat, the fluid outlet means formed on the pressure vessel including a second tube having a passageway extending therethrough, the second tube having an end portion sized to engage the inlet port of the valve head, the second valve actuating means including a perforated platform positioned in and extending across the inside of the second tube of the outlet port of the pressure vessel, and a valve actuating pin positioned on the platform for pushing the spherical seal away from the second valve seat in the inlet port of the valve head to permit flow of fluid from the second tube of the pressure vessel to and through the second passageway of the valve head when the pressure vessel is connected to the valve head, the second tube of the outlet port of the pressure vessel being positioned inside the first tube of the fluid inlet means of the pressure vessel, and the second passageway in the valve head being positioned inside the annular passageway portion of the first passageway of the valve head.

12. An automatic valving unit for a pressure vessel that holds a cartridge, loose media, and the like for a conditioning and/or purifying a fluid, comprising a valve head having a first passageway extending through it and being adapted to be connected to a fluid transmission line, an outlet port formed at an outlet end portion of the first passageway in the valve head, the first passageway having an annular passageway portion at its outlet end portion defined by opposing passageway walls, said opposing passageway walls being tapered towards each other resulting in the first passageway having a cross-section that narrows towards the outlet port of the valve head, the tapered opposing passageway walls forming a first valve seat, an annular seal positioned in the annular passageway portion of the first passageway, the annular seal being sized to block flow of a fluid through the first passageway when the annular seal rests on the first valve seat and to permit flow of fluid through the first passageway when the annular seal is displaced from the first valve seat, fluid inlet means formed on the pressure vessel, the fluid inlet means comprising a first tube, the first tube having an end portion being sized to be received in the annular passageway portion of the first passageway of the outlet port of the valve head to push the annular seal away from the first valve seat without closing the outlet port of the valve head to allow flow of fluid from the outlet port of the valve head into the first tube of the pressure vessel when the pressure vessel is connected to the valve head, and connecting/disconnecting means formed at the outlet port of the valve head and on the first tube of the pressure vessel for connecting the pressure vessel to the valve head, when desired, to permit flow of fluid from the valve head to the pressure vessel, and for disconnecting the pressure vessel from the valve head, when desired, to stop flow of fluid from the valve head.

13. An automatic valving unit for a pressure vessel that holds a cartridge, loose media, and the like for a conditioning and/or purifying a fluid, comprising a valve head having a first passageway extending through it and being adapted to be connected to a fluid transmission line, an outlet port formed at an outlet end portion of the first passageway in the valve head, the first passageway having an annular passageway portion at its outlet end portion defined by opposing passageway walls, said opposing passageway walls being tapered towards each other resulting in the first passageway having a cross-section that narrows towards the outlet port of the valve head, the tapered opposing passageway walls forming a first valve seat, an annular seal positioned in the annular passageway portion of the first passageway, the annular seal being sized to block flow of a fluid through the first passageway when the annular seal rests on the first valve seat and to permit flow of fluid through the first passageway when the annular seal is displaced from the first valve seat, fluid inlet means formed on the pressure vessel, the fluid inlet means comprising a first tube, the first tube having an end portion being sized to be received in the annular passageway portion of the first passageway of the outlet port of the valve head to push the annular seal away from the first valve seat without closing the outlet port of the valve head to allow flow of fluid from the outlet port of the valve head into the first tube of the pressure vessel when the pressure vessel is connected to the valve head, and connecting/disconnecting means formed at the outlet port of the valve head and on the first tube of the pressure vessel for connecting the pressure vessel to the valve head, when desired, to permit flow of fluid from the valve head to the pressure vessel, and for disconnecting the pressure vessel from the valve head, when desired, to stop flow of fluid from the valve head, further including a second passageway formed in and extending through the valve head and being adapted to be connected to a fluid receiving line at an outlet port of the second passageway, an inlet port formed at an inlet end portion of the second passageway in the valve head, the second passageway having an inner end portion and an outer end portion, the second passageway at the outer end portion of the second passageway having at the inlet port of the valve head a cross-section that is smaller than a cross-section of the second passageway at the inner end portion of the second passageway, forming a second valve seat therebetween, a spherical seal positioned in the second passageway of the inlet port of the valve head, the spherical seal being sized to block flow of a fluid from the second passageway of the inlet port of the valve head when the spherical seal rests on the valve seat and to permit flow of fluid through the second passageway of the inlet port of the valve head when the spherical seal is displaced from the second valve seat, an outlet port of the pressure vessel, the outlet port of the pressure vessel comprising a second tube having a passageway extending therethrough, the second tube having an end portion having a cross-section sized to engage the inlet port of the valve head, a perforated platform positioned in the second tube of the outlet port of the pressure vessel, and a valve actuating pin positioned on the platform for pushing the spherical seal away from the second valve seat at the inlet port of the valve head to permit flow of fluid from the second tube of the pressure vessel to and through the second passageway of the valve head when the pressure vessel is connected to the valve head.

14. An automatic valving unit for a pressure vessel that holds a cartridge, loose media, and the like for a conditioning and/or purifying a fluid, comprising a valve head having a first passageway extending through it and being adapted to be connected to a fluid transmission line, an outlet port formed at an outlet end portion of the first passageway in the valve head, the first passageway having an annular passageway portion at its outlet end portion defined by opposing passageway walls, said opposing passageway walls being tapered towards each other resulting in the first passageway having a cross-section that narrows towards the outlet port of the valve head, the tapered opposing passageway walls forming a first valve seat, an annular seal positioned in the annular passageway portion of the first passageway, the annular seal being sized to block flow of a fluid through the first passageway when the annular seal rests on the first valve seat and to permit flow of fluid through the first passageway when the annular seal is displaced from the first valve seat, fluid inlet means formed on the pressure vessel, the fluid inlet means comprising a first tube, the first tube having an end portion being sized to be received in the annular passageway portion of the first passageway of the outlet port of the valve head to push the annular seal away from the first valve seat without closing the outlet port of the valve head to allow flow of fluid from the outlet port of the valve head into the first tube of the pressure vessel when the pressure vessel is connected to the valve head, and connecting/disconnecting means formed at the outlet port of the valve head and on the first tube of the pressure vessel for connecting the pressure vessel to the valve head, when desired, to permit flow of fluid from the valve head to the pressure vessel, and for disconnecting the pressure vessel from the valve head, when desired, to stop flow of fluid from the valve head, further including a second passageway formed in and extending through the valve head and being adapted to be connected to a fluid receiving line at an outlet port of the second passageway, an inlet port formed at an inlet end portion of the second passageway in the valve head, the second passageway having an inner end portion and an outer end portion, the second passageway at the outer end portion of the second passageway having at the inlet port of the valve head a cross-section that is smaller than a cross-section of the second passageway at the inner end portion of the second passageway, forming a second valve seat therebetween, a spherical seal positioned in the second passageway of the inlet port of the valve head, the spherical seal being sized to block flow of a fluid from the second passageway of the inlet port of the valve head when the spherical seal rests on the valve seat and to permit flow of fluid through the second passageway of the inlet port of the valve head when the spherical seal is displaced from the second valve seat, an outlet port of the pressure vessel, the outlet port of the pressure vessel comprising a second tube having a passageway extending therethrough, the second tube having an end portion having a cross-section sized to engage the inlet port of the valve head, a perforated platform positioned in the second tube of the outlet port of the pressure vessel, and a valve actuating pin positioned on the platform for pushing the spherical seal away from the second valve seat at the inlet port of the valve head to permit flow of fluid from the second tube of the pressure vessel to and through the second passageway of the valve head when the pressure vessel is connected to the valve head, the second tube of the outlet port of the pressure vessel being positioned inside the first tube of the fluid inlet means of the pressure vessel, and the second passageway in the valve head being positioned inside the annular passageway portion of the first passageway of the valve head.

15. An automatic valving unit for permitting flow of a fluid from a fluid transmitting member to a fluid receiving member when the fluid transmitting member is connected to the fluid receiving member and for stopping flow from the fluid transmitting member when the fluid receiving member is disconnected from the transmitting fluid member, comprising an outlet port of the fluid transmitting member, the outlet port comprising an annular passageway defined by opposing passageway walls, the passageway having an inner end portion and an outer end portion, the passageway having a portion where the opposing passageway walls are tapered towards each other resulting in the passageway having a cross-section that narrows towards the outer end portion of the passageway, the tapered opposing passageway walls forming a first valve seat, an annular seal positioned in the annular passageway, the annular seal being sized to block flow of a fluid through the annular passageway when the annular seal rests on the first valve seat and to permit flow of fluid through the annular passageway when the annular seal is displaced from the first valve seat, an inlet port of the fluid receiving member, the inlet port comprising a first tube, the first tube having an end portion sized to be received in the annular passageway of the outlet port of the fluid transmitting member to push the annular seal away from the first valve seat without closing the outlet port of the fluid transmitting member to allow flow of fluid from the outlet port of the fluid transmitting member into the inlet port of the fluid receiving member when the fluid receiving member is connected to the fluid transmitting member, and connecting/disconnecting means formed at the outlet port of the fluid transmitting member and on the first tube of the inlet port of the fluid receiving member for connecting the fluid receiving member to the fluid transmitting member, when desired, to permit flow of fluid from the fluid transmitting member to the fluid receiving member, and for disconnecting the fluid receiving member from the fluid transmitting member, when desired, to stop flow of fluid from the fluid transmitting member.

16. In combination, an outlet port of a fluid transmitting member and a pressure vessel adapted to be mounted on the outlet port for holding a filter for conditioning and/or purifying fluid transmitted from the outlet port, the outlet port comprising an annular passageway defined by opposing passageway walls, the passageway having an inner end portion and an outer end portion, the passageway having a portion where the opposing passageway walls are tapered towards each other resulting in the passageway having a cross-section that narrows towards the outer end portion of the passageway, the tapered opposing passageway walls forming a first valve seat, an annular seal positioned in the annular passageway, the annular seal being sized to block flow of a fluid through the passageway when the annular seal rests on the first valve seat and to permit flow of fluid through the passageway when the annular seal is displaced from the valve seat, the pressure vessel comprising a cover having a top wall and a side wall extending downwardly therefrom, inlet means formed in the top wall of the cover for introducing fluid to the pressure vessel, the inlet means including a first tube, the first tube having an end portion sized to be received in the annular passageway of the outlet port of the fluid transmitting member to push the annular seal away from the first valve seat without closing the outlet port of the fluid transmitting member to allow flow of fluid from the outlet port of the fluid transmitting member into the first tube of the pressure vessel when the pressure vessel is connected to the fluid transmitting member, and connecting/disconnecting means formed on the outlet port of the fluid transmitting member and on the first tube of the inlet port of the pressure vessel for connecting the pressure vessel to the fluid transmitting member, when desired, to permit flow of fluid from the fluid transmitting member to the pressure vessel, and for disconnecting the pressure vessel from the fluid transmitting member, when desired, to stop flow of fluid from the fluid transmitting member.

\* \* \* \* \*